(12) United States Patent
Haglund (10) Patent No.: US 6,954,430 B2
(45) Date of Patent: Oct. 11, 2005

(54) LOAD REGULATION

(75) Inventor: Anders Bertil Haglund, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 930 days.

(21) Appl. No.: 09/811,678

(22) Filed: Mar. 16, 2001

(65) Prior Publication Data

US 2001/0040872 A1 Nov. 15, 2001

(30) Foreign Application Priority Data

Mar. 20, 2000 (SE) .............................................. 0000908

(51) Int. Cl.[7] .............................................. H04L 12/26
(52) U.S. Cl. ...................................... 370/232; 370/429
(58) Field of Search ................................ 370/229, 230, 370/230.1, 231, 232, 233, 234, 252, 253, 395.2, 395.21, 395.41, 395.42, 412, 415, 417, 429

(56) References Cited

U.S. PATENT DOCUMENTS

| 4,897,855 A | | 1/1990 | Acampora |
| 5,606,362 A | * | 2/1997 | Lee .......................... 348/14.12 |
| 5,825,778 A | | 10/1998 | Hauge |
| 6,061,354 A | * | 5/2000 | Morikawa et al. ........ 370/395.7 |
| 6,091,709 A | * | 7/2000 | Harrison et al. ............ 370/235 |
| 6,393,532 B1 | * | 5/2002 | Takada et al. ............... 711/154 |
| 6,775,550 B2 | * | 8/2004 | Ballard et al. ........... 455/452.2 |

FOREIGN PATENT DOCUMENTS

| EP | 0 599 449 A2 | 6/1994 |
| WO | 00/57668 A1 | 9/2000 |

OTHER PUBLICATIONS

Iraj Farhoudi, "RCR STD–27—Additional Emission Requirement for the Japanese Market", EMS& Safety Journal, 1–97.

* cited by examiner

*Primary Examiner*—Kwang Bin Yao (57) ABSTRACT

The present invention discloses a process unit (10) comprising a real data generator (12), a buffer (14) buffering the data and a queue length monitor (16), which regulates the data generator (12) depending on the queue length. The system is characterized by a dummy load generator (18), storing dummy data in the same buffer (14) at a dummy data rate. The queue length monitor (16) regulates this dummy data rate. The process unit (10) may also be used in a system (1), further comprising a transmitter (20), a link (22) and a receiver (24) and possibly also other process units. The advantages with the present invention is that a faster regulation can be achieved, also for slowly reacting process units, which counteract overflow in the buffers (14). Furthermore, the queue lengths are possible to reduce and the delays of data are reduced.

21 Claims, 5 Drawing Sheets

LOAD REGULATION

TECHNICAL FIELD

The present invention generally relates to data communication, and in particular to data communication between devices having limited bandwidth.

BACKGROUND

In many systems of today, data communication between different devices is one of the basic procedures on which the operation of the system depends. There are a large number of systems using data communication, e.g. telecommunication systems, industrial monitoring and control systems and traffic surveillance systems. There is often a requirement that the transfer time of the data does not exceed a maximum time, or that the transfer time is predictable within certain limits. At the same time, communication at high bandwidth is often expensive and the capacity of the communication links is mostly adapted to handle a normal high-intensity communication situation. However, abnormal traffic situations may cause congestion or loss of information. Thus, there is a general wish to monitor the capacity situation in different communication links in order to control the intensity of the data communication.

A method often used to handle temporary link capacity variations is to include buffers, which temporarily store the data until free link capacity is available. However, in order to handle large capacity variations, the size of the buffers has to be large. A disadvantage with this solution is that large buffers are expensive and that the delay in a large buffer may be unacceptably large. Instead, a regulation of the production of data to be communicated is required. By monitoring the capacity need and the free link capacity, such a regulation may be performed. However, such monitoring normally requires an additional data communication in the opposite direction, a feedback of information in the opposite direction compared with the normal communication, which requires additional hardware or results in a lower mean link capacity.

In prior art, solutions are presented, where a buffer of a transmission link is monitored. When the number of waiting messages or data packets increases, it may be that the link capacity temporarily is exceeded, and when the number of waiting messages or data packets decreases, free link capacity is used for shortening the queues. When the link capacity is exceeded, a regulation of the process generating the messages or data may be performed in order to reduce the generation rate of messages. However, if more than one process uses the same transmission link, the situation becomes more complicated, and an interconnection between the different processes is often necessary Furthermore, if the regulation of a process is slow, i.e. if the time from that a regulation starts until there is a noticeable change of the output rate, the buffer still has to be large in order to store all messages created in the meantime.

A general problem with certain devices according to prior art is that they give rise to large delays and that they require comparatively large buffer areas.

In the U.S. Pat. No. 6,091,709 a QoS management system for packet switched networks is disclosed. The basic idea concerns a problem specific to packet transmission networks—to meet guaranteed real-time services. A packet router system comprising a number of queues with different priorities. The mean delay of the packets in each queue, by time-stamping the packets at the entering into the queue. Intermittent monitoring of the mean age of the packets are performed. If the mean delay is under a first threshold, filler flow is directed to the queue, to get the queue to operate just around this threshold. The filler flow may consist of packets from queues with lower priority or if such are not available "dummy packets". If a second delay threshold is passed, further packets directed to that queue is discarded. The thresholds are defined by using a relation between enqueued traffic and delay. The entire method relies heavily on the reliability of this relation curve, but no indications about how such curve is obtained are presented. The provision of reliable relation curves are far from simple. The procedure is particularly developed for systems being real-time critical and having a number of priority levels. The applicability on unity-priority systems is questionable. Furthermore, since an average forwarding delay is used, the method will have severe problems in handling burst-like traffic. Moreover, a measure of the average delay in a queue does not immediately concern the actual available or requested buffer length. Another problem of the above technique is that the process does not operate properly at longer congestion periods or at very sudden increases in traffic intensity.

SUMMARY

A general object of the present invention is thus to improve the regulation of the amount of information to be sent on a communication link. A further object is to provide a regulation, which counteracts exceeded transmission capacity and overflow in buffers. Another object is to provide a regulation, which reduces the problems if the transmission capacity of the link is exceeded. Yet another object of the present invention is to decrease the queue lengths in the buffers to reduce the delays of information.

The above objects are achieved by units, systems and methods according to the present claims. In general, a process unit, producing real data for communication with other units, comprises a real data generator, a first buffer buffering the data and a queue length monitor, which regulates the data generator depending on the queue length in the buffer. The system is characterized by a dummy load generator, storing dummy data in the buffer at a dummy data rate. The queue length monitor regulates the dummy data rate. The process unit may also be used in a system, further comprising a transmitter, a link and a receiver and possibly also other process units.

The advantage with the present invention is that a faster regulation can be achieved, also for slowly reacting process units, which faster regulation counteracts overflow in the buffers. Furthermore, the queue lengths are possible to reduce and the delays of data are reduced.

BRIEF DESCRIPTION OF THE DRAWINGS

The invention, together with further objects and advantages thereof, may best be understood by making reference to the following description taken together with the accompanying drawings, in which.

DETAILED DESCRIPTION

Figure 1:
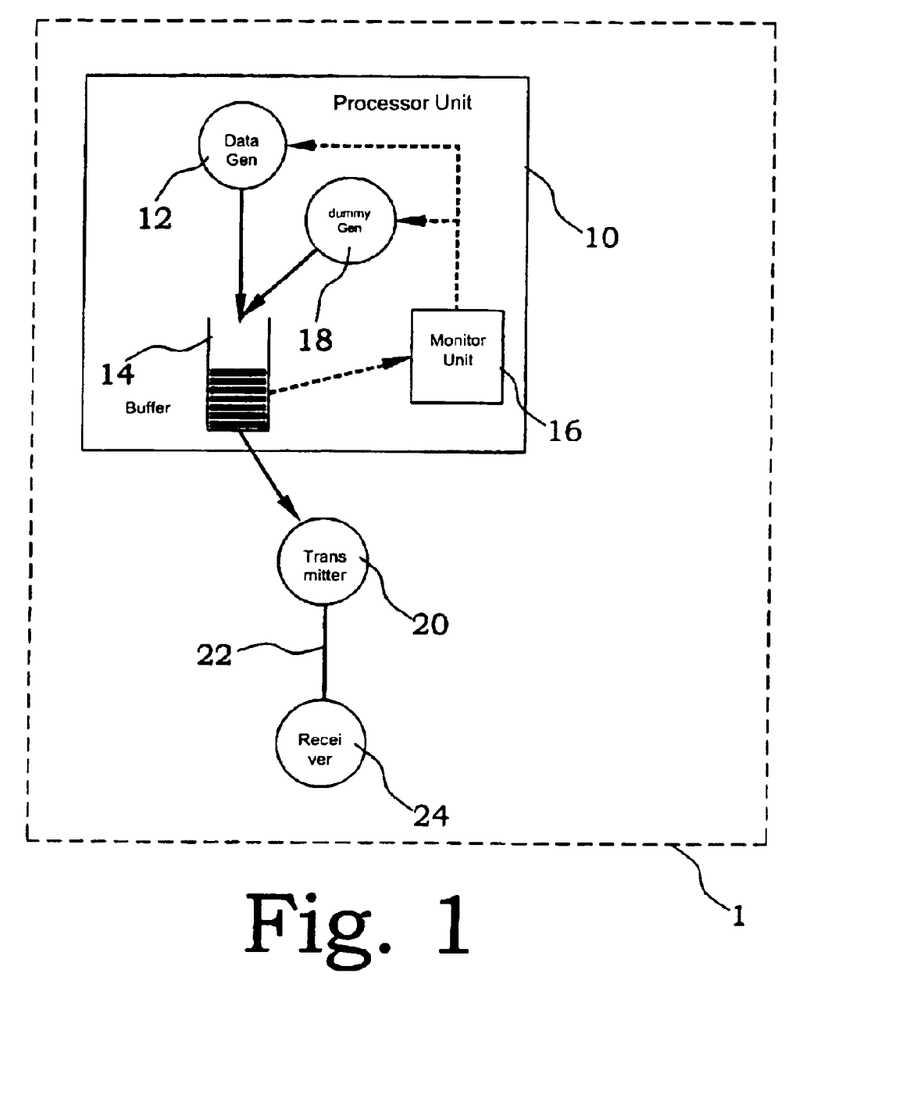
FIG. 1 is a schematic block diagram illustrating an embodiment of a process system comprising one process unit according to the present invention.

In FIG. 1, an embodiment of a process system 1 is illustrated. A process unit 10 comprises a real data generator 12. The real data generator 12 performs the main task of the process unit 10 and the output data from that process is intended to be sent to another part of the process system 1. The process unit is for this purpose served by a transmitter 20, which sends information (messages) from the process unit further on a communication link 22 to a receiver 24. The output from the real data generator 12 is real data, which is stored in a buffer 14, waiting for the transmitter 20 to poll the data for transmission.

A monitoring unit 16 monitors the buffer 14. By measuring the length of the queue, i.e. the amount of data waiting for transmission, information about whether the capacity of the link 22 is reached or not is obtained. If the presently available link 22 capacity for the process unit 10 is too small, the number of waiting messages will increase. If the queue length instead decreases, the rate in which the messages are created is lower than the available link 22 capacity. A longer queue gives longer delay times, so one important task is to reduce the number of messages waiting in the buffer 14. If the number of messages in the buffer 14 starts to increase, the monitoring unit 16 informs the real data generator 12 about the congestion in the transmission link 22, and the real data generator 12 regulates the rate in which output data is created. In such a manner, an overload of the buffer may be avoided.

However, when the regulation of the real data generator 12 is slow, e.g. when only the number of started jobs may be reduced, and when jobs under processing can not be influenced, the solution of the present invention comes into useful operation. According to the present invention, the process unit also comprises a dummy load generator 18. Under normal operation, the dummy load generator 18 generates dummy data, and sends the dummy data for storage in the same buffer 14 as for the real data messages at a "dummy data rate". This rate is the rate of generating dummy data, or even more correctly, the rate at which the dummy data is stored in the buffer 14. The dummy data typically does not comprise any useful information and is only used for filling-up purposes. The dummy load generator 18 typically has a maximum dummy data rate, and the dummy data rate at a certain moment may therefore vary from zero up to this maximum dummy data rate. When there is available capacity of the link 22, the dummy messages are just sent as any other messages and do not occupy any capacity from the real messages. The buffer 14 is in this situation substantially empty (except for a very short temporary use just upon writing into the buffer). The receiver 24 identifies the dummy data and ignores or discards it. The dummy data is therefore not brought further in the system.

When the total data generation rate, i.e. the real data generation rate plus the dummy data rate, exceeds the available capacity of the link 22, a queue starts to build up in the buffer 14. In such a situation, the dummy data competes with the real data about the transmission resources. The dummy data rate is reduced, based on the queue length in the buffer 14, in order to release transmission capacity. The dummy data rate and the total data generation rate drop quickly, solving the problem of temporary lack of capacity. However, since the dummy data load only corresponds to a small part of the total available transmission capacity, the available transmission capacity is only slightly larger than the real data load.

The need for regulating the dummy data load acts as a warning about a possible coming lack of transmission capacity. It is therefore of interest to also start regulating the real data generation rate, in order to meet a coming congestion. The fast regulation of the dummy load thus operates as a buffer in order to give the process unit time enough to regulate down the real data generation rate. Accordingly, the monitoring of the buffer 14 controls both the real data generation rate and the dummy data rate.

The maximum dummy data rate is preferably adjusted to the properties of the process unit in which the dummy load generator is incorporated. A real data generator with a large inertia regarding generation rate needs a higher maximum dummy data rate in order to accomplish the necessary pre-notification of a congestion in the transmission system. The regulation response time of the real data generator constitutes the base on which the maximum value of the dummy data rate is determined. A fast responding real data generator needs a low maximum dummy data rate and a slowly responding real data generator needs a high maximum dummy data rate.

The simplest way of regulating the load of dummy data is to turn it on and off, i.e. to select between the maximum dummy data rate and zero. However, such a regulation is quite inflexible, leading to unnecessary restrictive real data generation rates. Accordingly, the regulation of the dummy data rate is preferably performed stepwise or continuously (down to the size of the basic transmission unit).

Figure 2A:
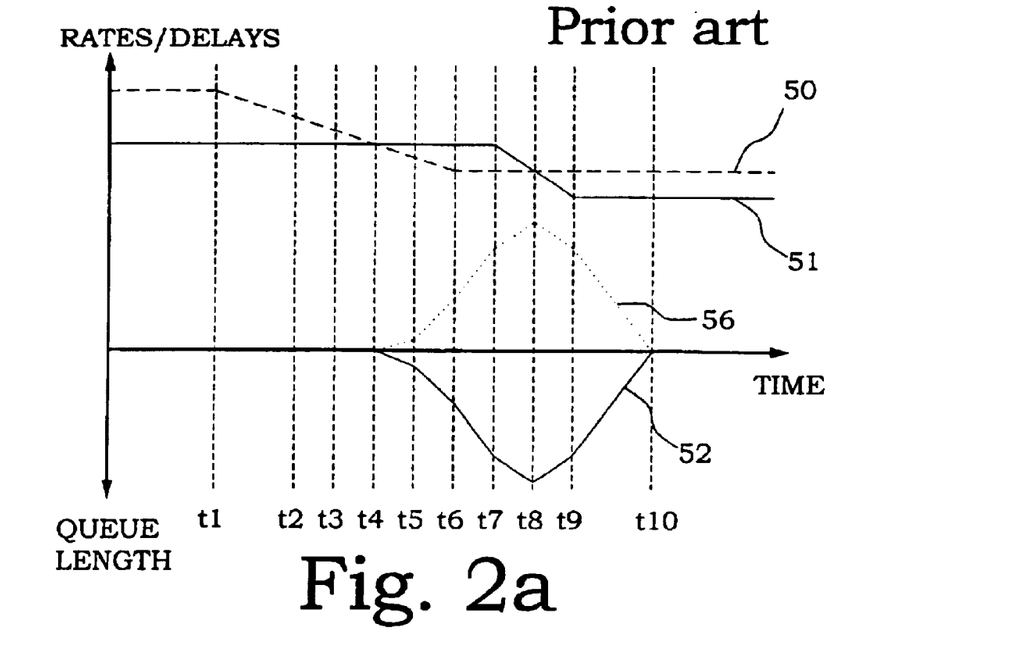
FIG. 2a is a diagram illustrating an exemplifying situation of data generation and transmission rates in a process system according to prior art.

In order to visualize the operation of the present invention, an example of a situation of data generation and transmission rates in a process system 10 according to prior art is illustrated in FIG. 2a. A broken line 50 in the upper part of the figure illustrates the transmission capacity of a transmission link. The transmission capacity starts at the maximum value, but decreases rapidly between the time t1 and the time t6 to 70% of its maximum value. The normal data generation rate of the process unit, illustrated as a solid line 51 in the figure, is in this example 80% of the maximum transmission capacity, and when the full transmission capacity is available, all data can be transmitted without delays. In a system according to prior art, the process unit is unaware of the beginning decrease of available transmission rate 50 at t1. At the time t4, the data generation rate 51 exceeds the available transmission rate 50 and a queue starts to build up in the buffer, as indicated by the line 52 in the bottom part of FIG. 2a. At time t5, this build-up is detected and interpreted as a congestion. The process unit is regulated to give a final data generation rate 51 of 60% of the maximum available transmission rate, but due to the inertia in the process unit, the actual decrease in the generation rate 51 does not start until time t7. The data generation rate 51 of the process unit drops below the presently available transmission rate 50 at t8 and reaches the goal of the regulation at t9. In the meantime, a queue has built up in the buffer. The queue length 52 increases until the real data generation rate 51 is lower than the transmission rate 50, i.e. until t8. When the available transmission rate 50 becomes higher than the data generation rate 51, the queue length starts to decrease again, but the queue will not be empty until the time t10. The buffer size necessary for avoiding overload of the buffer is considerable during the regulation of the process unit. The delay time for a message, stored temporary in the buffer, is closely related to the present length of the queue and the available transmission rate. An estimated delay time in the queue in the buffer for messages in the described system is indicated by the dotted line 56. When the queue length increases, the delay of messages also increases. This is particularly serious, since a queue build-up normally is caused by a decrease in transmission rate, which also by itself increases the delay times.

Figure 2B:
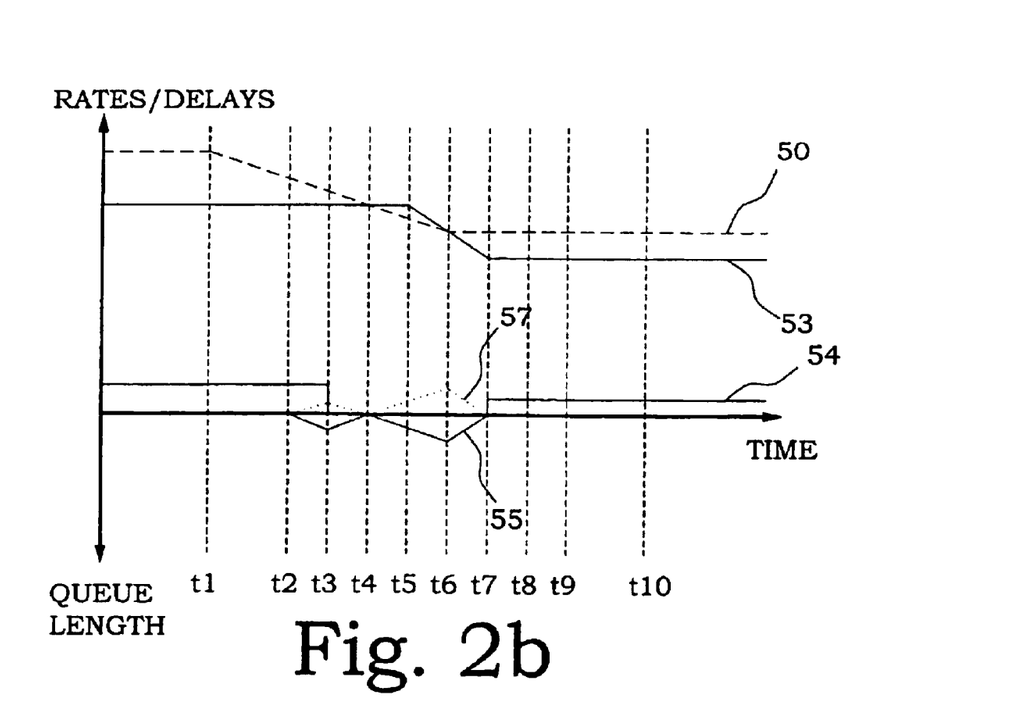
FIG. 2b is a diagram illustrating an exemplifying situation of data generation and transmission rates in an embodiment of a process system according to the present invention.

FIG. 2b, illustrates the same situation, but for a process system according to the present invention. Also here, the transmission rate decreases from 100% to 70% between t1 and t6, as indicated by the broken line 50 in the upper part of the figure. A real data generation rate of 80% of the maximum transmission rate is present, as illustrated by the solid line 53. According to the invention, a dummy data rate is present, illustrated by a solid line 54. In this example, the starting level of the dummy data rate 54 is 10% of the maximum transmission rate. As before, in the beginning, the transmission rate 50 is sufficient, and there are no delays of the data. The real data is delivered as fast as it should have been also without dummy load. However, at the time t2, the total data generation rate exceeds the actual transmission rate, that is, the sum of the real data generation rate 53 and the dummy data rate 54. A queue is starting to build up in the buffer, as indicated by 55 in the bottom of the figure. At t3, this build-up is detected and interpreted as a congestion. The dummy load 54 is quickly stopped and a regulation of the real data generation rate 53 down to 60% is ordered. Due to the inertia in the process unit, the actual decrease in the generation rate 53 does not start until time t5. In the meantime a margin is available due to the drop in the dummy data rate 54, which keeps the queue length down. At t7, the regulation of the process unit is finished. In this example, the buffer is emptied from its last waiting data already at the same time t7. As seen in the bottom of FIG. 2b, the buffer queue length can be kept very short, which reduces the requirements of necessary buffer size as well as the delay time of the data. An estimated delay time in the queue in the buffer for messages in the described system is indicated by the dotted line 57, which obviously is much less serious than in the system of FIG. 2a.

At t7, the dummy load is again turned on, now at a slightly lower rate, in order to assist at the next occasion where the transmission rate changes. In order to detect a subsequent increase in actual transmission rate, the dummy data rate is intermittently increased temporarily. If a queue starts to build up, it is reduced again. If the increased dummy data rate does not give rise to any buffer queue, the process unit can be regulated to a higher real data generation rate.

Figure 3:
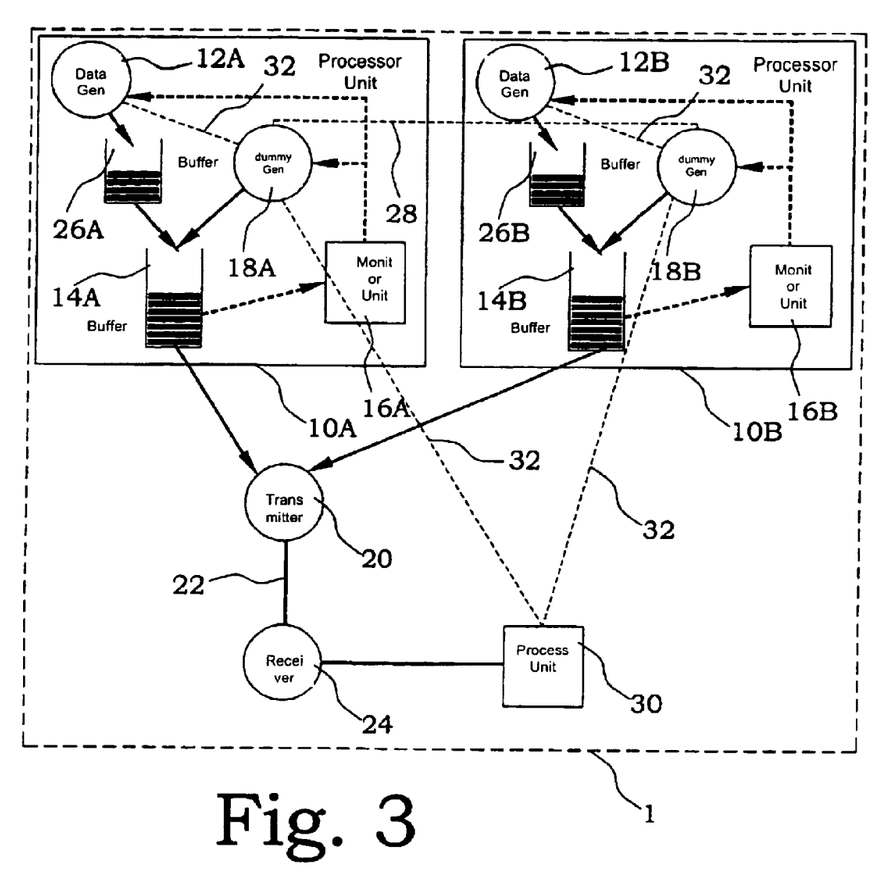
FIG. 3 is a schematic block diagram illustrating another embodiment of a process system comprising two process units according to the present invention.

In FIG. 3, a system 1 with two process units 10a, 10b sharing a common transmission link 22 is illustrated. Each one of the process units 10a, 10b comprises a real data generator 12a, 12b, which performs the main task of the process unit 10a, 10b. The output data is temporarily stored in a real data buffer 26a, 26b before it is stored in a main buffer 14a, 14b. The process units 10a and 10b are connected to one common transmitter 20, which polls data from both main buffers 14a, 14b to be transmitted on the common link 22 to a receiver 24. According to the present invention, each one of the process units 10a, 10b also comprises a monitoring unit 16a, 16b and a dummy load generator 18a, 18b. Each process unit 10a, 10b is arranged in a similar manner as the process unit in FIG. 1.

The two separate process units 10a, 10b may present different behavior regarding the response time and the real data generation rate of the real data generator 12a, 12b. The dummy load generator 18a may therefore be arranged in a different manner, compared with the dummy load generator 18b.

As above, the regulation response time for the real data generators in the different process units 10a, 10b is preferably used to determine the maximum storing rate of dummy data. When having more than one process unit connected to the same transmission link 22, the behavior may be different for the different units.

A process unit having a high rate of real data generation and thus having a higher utilization of the transmission link 22 than other process units is preferably furnished with a larger maximum dummy data rate in order to be able to regulate in time. Now a first example of how the dummy load may be distributed will be described. Assume that process unit 10a have a "long-term" average real data generation rate of 50% of the normally total available transmission capacity of the link 22, and the corresponding rate for process unit 10b is 25%. The "long-term" average is here intended to cover any normal fluctuations in real data generation rates during e.g. several days. If the regulation response times for the process units 10a and 10b are similar, a predetermined maximum dummy data rate of the dummy data generator 18a is preferably twice of that of dummy data generator 18b, e.g. 5% and 2.5%, respectively. In such a case, there is available. capacity reserved by means of dummy load so that both real data generators may increase their respective load by 10% above the long-term average without any problems. The maximum dummy data rate is in this example set to a predetermined value.

In a second example, the maximum dummy data rate is not constant, but is regulated. This regulated maximum dummy data rate could be a function of the present real data generation rate (and as stated above, the regulation response time). For example, the regulated maximum dummy data rate could be proportional to the present real data generation rate. In the system of FIG. 3, the real data buffers 26a, 26b may be used to measure the present real data generation rate.

Depending on the method used by the device controlling the poll of the main buffers 14a, 14b there could be a queue growth in one of the queues, while not in the other. For example, one of the process units could send dummy data at its maximum dummy data rate and have no restriction on the real data generation rate, while the other process unit sends no dummy data and has a growing queue of real data in its buffer 14. In such a case, it could be preferable to be able to redistribute the dummy load in order not to occupy capacity for any real data. Both process units could instead decrease their dummy load, allowing a larger real load. In such a situation, a regulation communication 28 has to be provided between the dummy load generators, either directly or indirectly. In FIG. 3, the regulation communication 28 is schematically drawn as a direct connection, however, as described below the actual connection could be made indirectly through other means of the system, as indicated by the broken line 32.

An alternative for a regulation communication 28 is to use a process unit 30 on the receiver side of the link 22. The process unit 30 may measure the received amount of data. An alternative is to use the dummy load to transmit data telling how much dummy load that is transmitted at the moment. The a dummy load may in a similar way also contain information about e.g. the generation rate of real data, the degree of regulation of the real data generator, the length of the queue and the growth rate in queue length in buffers 14. However, since the dummy data may be stopped at any time instance, the information sent by the dummy data should not be vital for the immediate operation. The process unit 30 may however e.g. calculate appropriate regulated maximum dummy data rates and transmit such information back to the process units 10*a* and 10*b* in order to redistribute the regulated maximum dummy data rate and perhaps also regulate the real data generation rate. Such redistribution of dummy load could be performed in such a slow pace that the communication does not occupy the link 22 too much in the direction opposite of the direction of the real data flow.

Another alternative for a regulation communication 28 is of course to have direct communication between the dummy data generators, negotiating about the available dummy data load.

The redistribution of dummy load can be performed in different manners. An alternative is to decrease the regulated maximum dummy data rates for the process units with the presently highest dummy data rate. Presume a process system with two process units, where both process units have a regulated maximum dummy data rate of 5% each. Suppose that one process unit sends dummy data at a rate of 5% and has no restriction on the real data generation rate, while the other process unit sends no dummy data and has a growing queue of real data in its buffer. By decreasing the regulated maximum dummy data rate of the process unit that sends dummy data, some capacity will be set free to reduce the rate at which the queue of the other process unit is growing. To set even more capacity free, the first process unit could even be explicitly ordered to regulate its real data generation. In this example, information about present dummy data rate and present growth rate in the queue of each process unit has to be communicated, put together and used to calculate new regulated maximum dummy data rates. The new regulated maximum dummy data rates should be communicated back to the process units.

Another example of redistribution of dummy load is described below. A process system has a number of process units with different real data generation rates. Let the heaviest loaded process unit send all dummy data. If all the process units are polled with the same priority, then the heaviest loaded process unit will detect a congestion first. In this example, information about present real data generation rate of each process unit has to be communicated and put together to give new regulated maximum dummy data rates. The new regulated maximum dummy data rates should be communicated back to at most two process units.

Yet another example of redistribution of dummy load is described below. Let the regulated maximum dummy data rate for each process unit equal a predetermined total maximum dummy data rate multiplied by the present real data generation rate of the process unit divided by the present total real data generation rate for all process units. Then the predetermined total maximum dummy data rate is constant for the link, distributed proportionally to the present real data generation rate of each process unit. In this example, information about present real data generation rate of each process unit has to be communicated and summed up. The sum could then be sent back to each process unit to calculate its regulated maximum dummy data rate.

Figure 4:
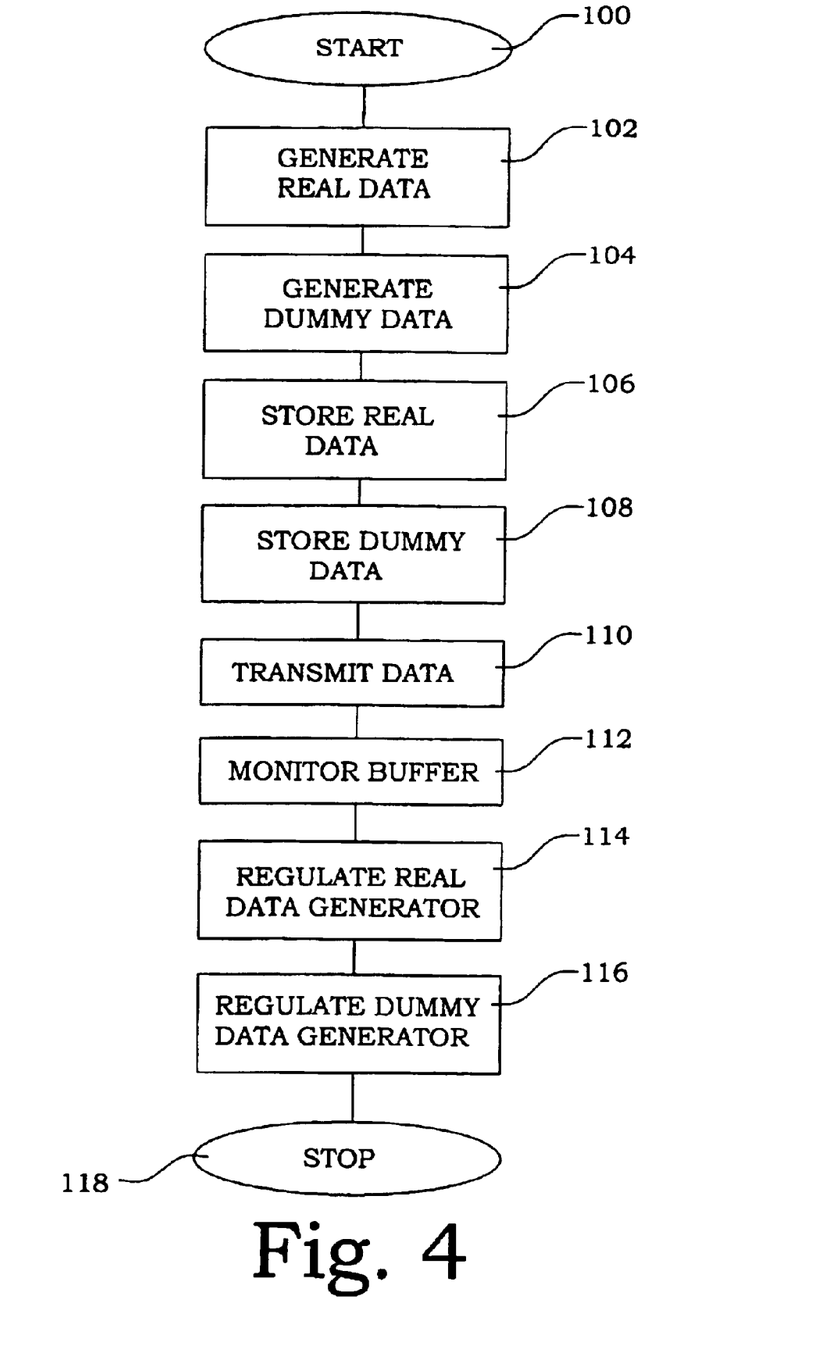
FIG. 4 is a flow diagram illustrating a transmission process according to the present invention.

FIG. 4 illustrates a general procedure according to the present invention. The different steps are not intended to be viewed as steps in a restricted order, but should merely represent steps, which are available for the system to take. Some steps could even be performed in parallel. The procedure starts in step 100. In step 102, a process generates real data to be sent to another part of the system. According to the invention, dummy data is generated in step 104. Step 106 presents the storage of the real data into a buffer of the process unit, and step 108 presents the corresponding storage of the dummy data into the same buffer. In step 110, the data of the buffer, real or dummy, is transmitted on an outgoing link. In step 112, the buffer is monitored in order to measure the queue length and detect any significant increase in the queue length. The result of the monitoring step is used in step 114 to regulate the rate of the real data generator and in step 116 to regulate the rate of the dummy data generator. The procedure is ended in step 118. The actual order of the steps is not absolutely fixed, although e.g. the generating steps have to be taken before the storage steps.

Figure 5:
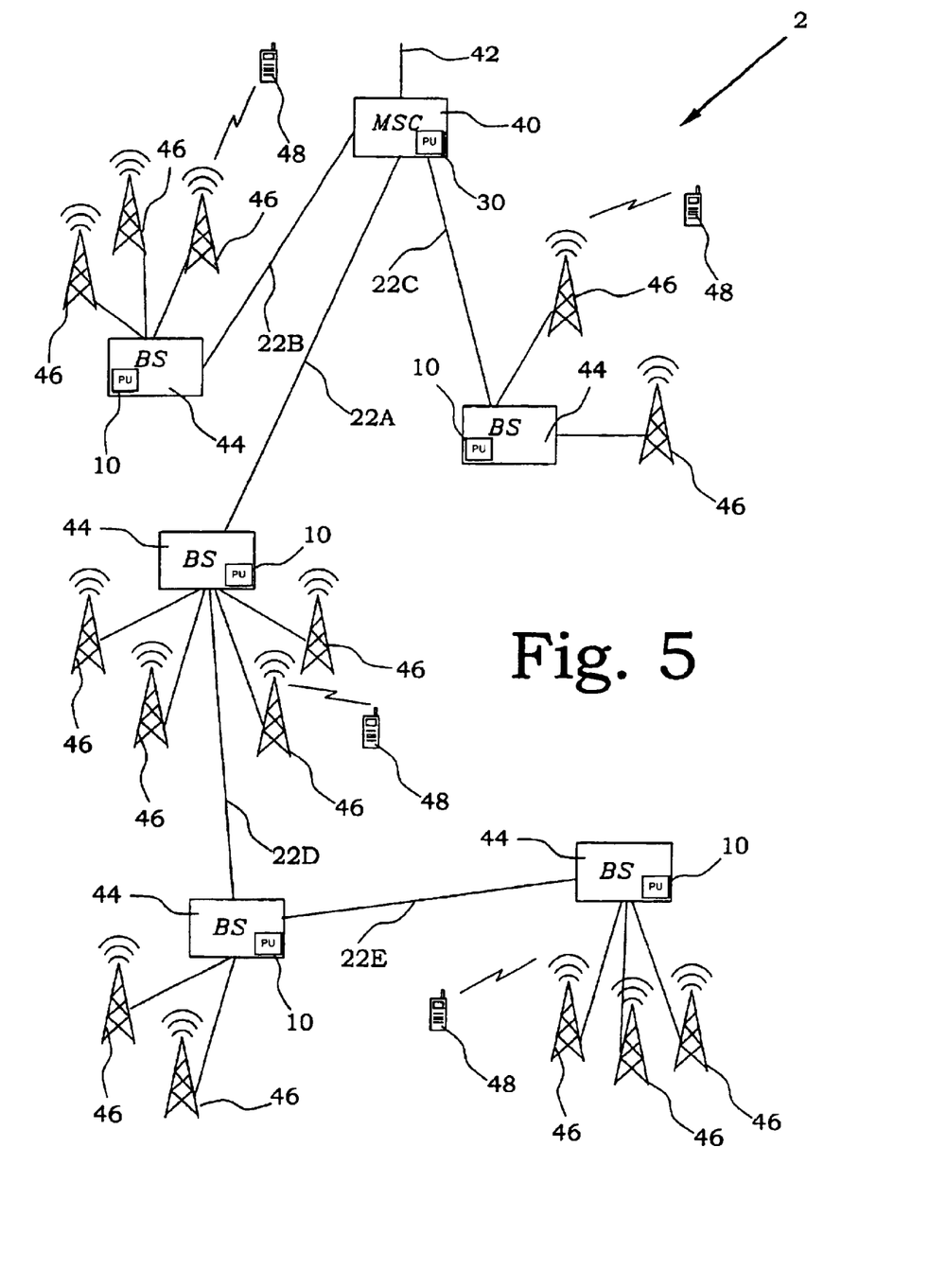
FIG. 5 is a schematic block diagram of a mobile telephony system, in which a process system according to the present invention can be used.

FIG. 5 illustrates a schematic block diagram of a mobile telephony system 2, in which a process system according to the present invention can be used. A Mobile Switching Center (MSC) 40 is connected to higher levels (not shown) of a mobile telephony network through a connection 42. The MSC 40 is in this example connected to five Base Stations (BSs) 44 via control signaling links 22A–22E. The BSs 44 may control a number of cells based around an antenna 46. The antennas are used to communicate with one or more mobile stations 48 in each cell. Two control signaling links 22B, 22C are separate for the respective BS. However, the BSs 44 may also be cascade connected, i.e. one BS may be reached via another BS and control links 22D, 22E. Different functions, belonging to different cells in one and the same BS 44 or cascade connected BSs, have to compete about the capacity of the same control signaling link 22A–E.

In some cases a high signaling level may occur. This can be caused by many subscribers wanting to make a call, which means that many originating calls from mobile stations 48 are made. If the control signaling link 22 A–E is exposed to disturbances, the available transmission capacity may be reduced, and at the same time some capacity is occupied by retransmitting disturbed data. Furthermore, other functionality may be introduced in the system using the control signaling link 22 A–E, such as e.g. sending of SMS messages (Short Message Service). The above described functions could all increase the signaling level, which may lead to an improper operation of the mobile telephony network.

In the Japanese mobile communication system, PDC standard RCR STD-27, there is a function specified as Radio Network Access Regulation (RNAR). One way to regulate the generation of real load sent from BS to MSC over the control signaling link 22 A–E is to use RNAR. With this function it is possible to restrict one or more mobile station groups from making originating calls. The restriction is made by broadcasting a message from the base station to the mobile stations. In the same way it is possible to restrict one or more mobile station groups from making location registrations. In the standard, general mobile stations are divided into eight mobile station groups. RNAR could be used, e.g. in situations with high signaling levels in order to reduce the delays and the amount of buffered data and to increase the throughput. This leads to a decreased number of rejected calls and less collisions in the radio interface.

From the occasion when a message including the restriction is sent to the mobile stations until all the mobile stations in the restricted group are silent, obeying the restriction, it could take up to about 21 seconds. If a mobile station 48 tries to make an originating call, it makes four attempts separated with about 6 seconds. During this time (3×6 seconds) the mobile station 48 is unreachable for the restriction message. It takes around 3 seconds from the initiation of the regulation until an available mobile station discovers that the regulation is active. This means that in the worst case, when an attempt for an originating call just has started, it may take up to 18+3=21 seconds before the mobile station 48 is aware of the restriction. The data belonging to originating calls and location registrations are sent from the mobile station 48 to the base station 44 over a radio interface. The base station 44 then sends data further on to the MSC 40 via the control signaling link 22 A–E. This link also carries data from different functions as well. Several devices within a BS 44 or several BSs 44 could share a common control signaling link 22 A–E. There is also load on the control signaling link 22 A–E from other functions than originating calls and location registrations. There are thus a lot of possible messages to be sent, even after a RNAR restriction has been ordered.

In the present system, the only way to monitor the load on the control signaling link 22 A–E is to see whether the amount of buffered data on the sending side of the control signaling link is increasing or not. The control signaling link 22 A–E then has to get overloaded before there is any indication of high load. Therefore it is necessary to wait for detection of overload before regulation of the load could be started, by restricting one or several mobile station 48 groups. Three BSs 44 are in this example connected to the same control signaling link 22A. To send a message to the MSC 40 over the control signaling link 22 A–E, the BS 44 puts the message in a queue which is polled by the device controlling the control signaling link. The BS 44 is also arranged to measure the queue length of the buffer. According to the present invention, the BSs 44 also comprise a dummy data generator.

As an example, each BS 44 is allowed to send dummy data of an amount of 5% of the theoretical control signaling link capacity, i.e. the bit rate from the dummy messages makes up 5% of the maximum bit rate of the link. The capacity on a link could be lower than the theoretical value because of "bad connections" which could lead to retransmissions. If the link is not congested, there will not be any long queues or long delays in those queues.

If the queue in one of the BSs 44 is detected to grow, the link utilization is over 100% of the link capacity at that moment. But 15% of the theoretical link capacity, corresponding to 15% or more of the current link capacity, is used for dummy load. The BS 44 could then impose a restriction on additional mobile station 48 groups regarding e.g. originating calls or location registrations to lower the load on the control signaling link 22 A–E. Since it takes long time before the restriction has effect, the BS 44 decreases the dummy load at the same time. The BS 44 regulates the dummy load so that the queue does not increase and is kept short, but preferably is still sending as much dummy load as possible (but always less than 5% each). The regulation is done so that the real load has priority over the dummy load. In this way, the total real link load from each BS could increase 5% of the theoretical link capacity before it is a real congestion with growing queues, which gives the restriction time to take effect.

If the BS 44 finds it possible to send 5% dummy load again without increasing the queue length, then this could be an indication to lower the number of restricted mobile station 48 groups. On the MSC 40 side of the link 22 A–E, all dummy messages are thrown away.

It will be understood by those skilled in the art that various modifications and changes may be made to the present invention without departure from the scope thereof, which is defined by the appended claims.

I claim:

1. A process unit, comprising:
   a real data generator for generating real data at a real data rate;
   a buffer, arranged to store said real data generated by said real data generator;
   a connection for transmitting data from said buffer;
   a queue length monitor, monitoring the queue length in said buffer; and
   a dummy load generator, arranged to store dummy data in said buffer at a dummy data rate being regulated based on said monitored queue length;
   whereby said real data rate for said real data generator is regulated based on said monitored queue length.

2. The process unit according to claim 1, wherein a maximum value of said dummy data rate is determined based on at least one of:
   the regulation response time of said real data generator, and
   the real data rate.

3. A process unit according to claim 1, wherein the process unit is included in a data communication or telecommunication system.

4. A process system, comprising:
   at least one process unit having a real data generator generating real data at a real data rate, a first buffer arranged to store said real data generated by said real data generator, a queue length monitor monitoring the queue length in said first buffer, and a dummy load generator arranged to store dummy data in said first buffer at a dummy data rate being regulated based on said monitored queue length, whereby said real; data rate for said real data generator is regulated based on said monitored queue length;
   a transmitter connected to said first buffer;
   a link over which data from said first buffer is transmitted by said transmitter; and
   a receiver receiving said data from said transmitter, said receiver being arranged to discard received dummy data.

5. The process system according to claim 4, wherein a maximum value of said dummy data rate is determined based on at least one of:
   the regulation response time of said real data generator, and
   the real data rate.

6. The process system according to claim 5, further comprising a second buffer arranged between said real data generator and said first buffer to store only real data, for detection of said real data rate of said real data.

7. The process system according to claim 4, having at least a first and a second process unit wherein said first and second process units each having a first buffer and said transmitter is connected to said first buffers of both said first and said second process unit, whereby said link transmits data from both of said process units.

8. The process system according to claim 7, wherein the dummy data rate of said first process unit is different from the dummy data rate of said second process unit.

9. The process system according to claim 7, further comprising communication means between said first process unit and said second process unit for exchange of regulation information.

10. The process system according to claim 9, wherein at least one of the dummy load generators comprises means for regulating the maximum value of said dummy data rate based on said regulation information.

11. The process system according to claim 9, wherein the regulation information includes at least one of:

information about dummy data rates;

information about real data rate;

information about any degree of regulation of the real data rate;

information about queue lengths; and information about queue length growth rates.

12. A process system according to claim 4, wherein the process unit is included in a data communication or telecommunication system.

13. A method of transmission, comprising the steps of:

generating real data at a real data rate, storing said real data in a first buffer, generating dummy data, storing said dummy data in said first buffer at a dummy data rate, transmitting data from said first buffer, monitoring the queue length in said first buffer, regulating the speed of the real data rate based on said monitored queue length, and regulating said dummy data rate based on said monitored queue length.

14. The method of transmission according to claim 13, further comprising the step of determining a maximum value of said dummy data rate based on at least one of:

the regulation response time of said real data, and the real data rate.

15. The method of transmission according to claim 13, wherein said step of regulating of said dummy data rate comprises the step of reducing the dummy data rate.

16. The method of transmission according to claim 15, wherein said step of regulating of said dummy data rate comprises the step of stopping said dummy data storing.

17. The method of transmission according to claim 15, in a system of at least two process units sharing a common link, further comprising the step of communicating regulation information between dummy load generators, whereby at least a part of said regulation information being selected from the list of:

information about dummy data rates, information about real data rate, information about any degree of regulation of the real data generation, information about queue lengths, and information about queue length growth rates.

18. The method of transmission according to claim 17, further comprising the step of regulating said maximum dummy data rate of at least one of said dummy load generators based on said regulation information.

19. The method of transmission according to claim 18, wherein said step of regulating said maximum dummy data rate is performed if uneven restrictions of the current dummy data rates are detected.

20. The method of transmission according to claim 13, further comprising the step of measuring the real data rate by storing said real data in a second buffer, prior to the storage in said first buffer.

21. A method according to claim 13, wherein the method is preformed in a data communication or telecommunication system.

* * * * *

UNITED STATES PATENT AND TRADEMARK OFFICE
CERTIFICATE OF CORRECTION

PATENT NO. : 6,954,430 B2  Page 1 of 1
APPLICATION NO. : 09/811678
DATED : October 11, 2005
INVENTOR(S) : Haglund It is certified that error appears in the above-identified patent and that said Letters Patent is hereby corrected as shown below:

On the Title Page, item (30), under "Foreign Application Priority Data", in Column 1, Line 1, delete "0000908" insert -- 0000908-4 --, therefor.

On the Title Page, item (57), under "Abstract" in Column 2, Lines 1 – 15, Please replace the Abstract with the following:
--A process unit including a real data generator, a buffer for buffering the data, and a queue length monitor, which regulates the data generator depending on the queue length is presented. The system is characterized by a dummy load generator, which stores dummy data in the same buffer at a dummy data rate. The queue length monitor regulates this dummy data rate. The process unit may also be use in a system, further including a transmitter, a link, a receiver, and possibly other process units. System provides for faster regulation, especially for slowly reacting process units, which counteracts overflow in the buffers. The system also provides for reduced queue lengths and delays of data are reduced.--

In Column 1, Line 4, delete "TECHNICAL FIELD", and insert -- BACKGROUND --, therefor.

In Column 1, Line 9, delete "BACKGROUND".

In Column 6, Line 59, after "The" delete "a".

In Column 12, Line 4, in Claim 17, delete "claim 15" and insert -- claim 13 --, therefor.

Signed and Sealed this

Eleventh Day of November, 2008

JON W. DUDAS
*Director of the United States Patent and Trademark Office*